Sept. 30, 1969  D. W. TRYHORN  3,469,393
TURBOCHARGED INTERNAL COMBUSTION ENGINE
Filed March 6, 1967  2 Sheets-Sheet 1

Sept. 30, 1969     D. W. TRYHORN     3,469,393
TURBOCHARGED INTERNAL COMBUSTION ENGINE Filed March 6, 1967     2 Sheets-Sheet 2

United States Patent Office 3,469,393
Patented Sept. 30, 1969

3,469,393
TURBOCHARGED INTERNAL COMBUSTION ENGINE
Donald Wilfred Tryhorn, St. Margarets, England, assignor of one-half to Sir W. G. Armstrong Whitworth & Company (Engineers), London, England
Filed Mar. 6, 1967, Ser. No. 620,743
Claims priority, application Great Britain, Mar. 11, 1966, 10,732/66
Int. Cl. F02b 37/04, 33/34; F02d 39/04
U.S. Cl. 60—13                                6 Claims

ABSTRACT OF THE DISCLOSURE

A multi-cylinder two-stroke cycle turbocharged compression ignition engine in which in each cylinder, the closure of the air ports by the piston effects termination of the scavenge process and the air then trapped serves as a charge for the cylinder including a charging system containing a two-stage combination of compressors, of which only one stage is exhaust gas turbine driven and the other is a series charger thereby providing improved running conditions with a smaller series charger than that employed for the known series charged engine.

---

This invention relates to a multi-cylinder two-stroke cycle turbo-charged compression ignition internal combustion engine of the "series system" kind, i.e., having another compressor means coupled in series with the turbocharger, while the object of the invention is to provide improved running conditions with a smaller compressor than previously used with the known series charged engine.

The two most used turbocharging systems are the "simple system" and the "series system." In the simple system, the turbochargers alone provide the excess of pressure in the air chest over that in the exhaust manifold which is necessary for there to be a supply of air to the engine cylinders. In the series system, another compressor known as the series charger is added to the system either before or after the turbocharger compressor and which may be driven by the engine itself or by an external power source. This raises the excess of pressure in the air chest of all the cylinders over that in the exhaust duct between the engine and turbocharger to a value greater than that given by the turbocharger compressor alone. For a comparable air flow through the engine, the series system permits the use of a lower turbocharger efficiency, and gives unaided starting. It is therefore used generally for small engines having a wide speed range, over the whole of which it is very difficult to obtain a high turbocharger efficiency.

The application of the series system involves the use of a compressor having a throughput at least comparable to the capacity of the engine; that is, the compressor delivery in ft.³/min. is equal to or greater than the engine swept volume in ft.³ × engine speed in rev./min. This series compressor is bulky, costly and absorbs an unnecessary amount of power, particularly at high engine speeds. The power absorbed directly lowers the engine output and efficiency, and also, by causing an increase in the temperature of the charging air, lowers the charge density and cycle efficiency.

To obtain good starting, air should be made to pass through the cylinders after the engine has fired the first time so that at least some of the exhaust gas in the cylinders is replaced by air. When the simple system is used, if the turbocharger is set spinning, it creates an air movement through the engine before any appreciable pressure is created. This flow is less than that given by the known series system (the size of the series compressor of which being chosen for engine peak torque conditions) but this air movement may be adequate for a second and some subsequent combustions.

The exhausting of the gases from these combustions further accelerates the turbocharger, and it starts to create pressure. At this stage, however, unless the air pressure, appreciably exceeds the exhaust pressure the engine will choke itself and not get away. This condition can be avoided by creating a positive scavenge through some, but not necessarily all, of the cylinders of the engine by means of a compressor in addition to the turbocharger. This compressor provides sufficient air to keep the engine running at an output high enough to keep the turbochargers running at a speed from which they can readily accelerate. In one method of doing this in accordance with the invention, the air chest is divided by a barrier to isolate some cylinders from the others. By this means, some may be positively scavenged by supplying them with air from a series charging system, while the rest are supplied by a simple turbocharging system. There can be no choking of the positively scavenged cylinders and in this invention exhaust gas from these cylinders is used to drive the turbine of the turbocharger supplying the simple turbocharged cylinders. Thereby this turbocharger obtains an adequate supply of exhaust gas which takes it through the choking conditions.

In another method in accordance with the invention, the air chest is not divided but the sizes of the turbines and compressors are chosen such that the air delivery pressure of the simple charging system is always as high as the sum of the pressures of the turbocharger compressor and the series charger of the series system compressor. Thus there is an air supply to all the cylinders which is dependent on the throughput of the series charger. This is of a size associated with only the series turbocharging means which is less than that of the known series system but greater than the minimum required to give sufficient power to overcome the friction losses of the engine itself by a margin which will permit acceleration during the lag period when the turbochargers are accelerating to match the new requirement of the engine. In a typical application of this system, a compressor having a throughput of half that on the un-turbocharged engine is used. The two methods referred to above may be combined on a single engine to take advantage of the improved starting and light load running given by the former and the better balance of pressures at high loads with the latter system.

This invention is directed to a multi-cylinder two-cycle turbocharged compression engine of the type in which in each cylinder having air ports and a piston, the closure of the air ports by the piston causes termination of the scavenge process and in which the trapped scavenge air serves for charging the cylinders, the improvement comprising a simple turbocharging system and a system including a two-stage series combination of compressors of which only one stage is gas turbine driven, both of said systems operating concurrently, and exhaust gas from the cylinders receiving air from said series system passing to the turbo means of the simple system.

The invention further consists in an engine as set forth in the preceding paragraph in which said simple and series charging systems supply air to a common air chest.

The invention still further consists in an engine as set forth above in which groups of cylinders supplied by a series turbo-charging system have an air chest separate from an air chest supplied by a simple turbocharging system.

The invention still further consists in an engine as set forth in the preceding paragraph in which there is communication between the air chests by a passegaway of controlled cross-sectional area.

The invention still further consists in an engine as set forth in the preceding paragraph in which said controlled area is made variable and is changed to suit engine operating condition.

The invention still further consists in an engine as set forth above in which all the exhaust gas produced by the cylinders charged by the series turbocharging system pass to the turbine means of the simple turbocharging system.

The invention still further consists in an engine as set forth above having more than one turbocharger and in which any turbocharger has its turbine mass flow substantially different from its compressor mass flow.

The accompanying drawings show, by way of example only, several embodiments of the invention in which.

Figure 1:
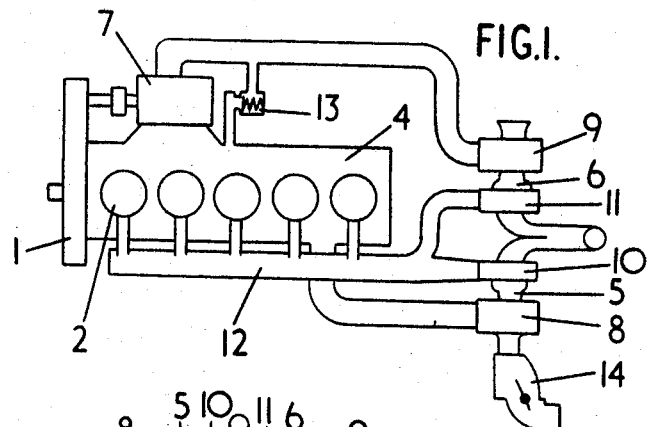
FIGURE 1 shows in diagrammatic form a plan of the layout of the charging system in which a high pressure turbocharger supplies the air directly to the air chest and a low pressure turbocharger supplies air by way of a series charger to the same air chest.
Figure 2:
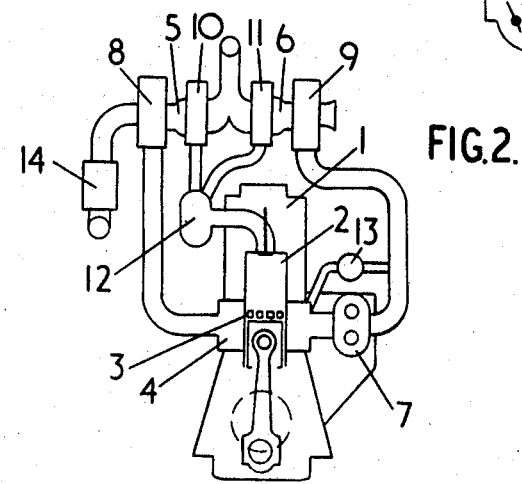
FIGURE 2 shows in diagrammatic form a cross-sectional elevation of the engine of FIGURE 1.

Engine 1 of FIGURES 1 and 2, has a plurality of cylinder 2 each with a port belt 3 through which passes all the air for the scavenging and charging of the cylinder. An air chest 4 surrounding said port belts is supplied by two charging systems working in parallel, namely a simple system comprising a high pressure turbocharger 5 and a series system comprising a low pressure turbocharger 6 and a series charger 7 which in this case is engine driven.

The series charger's main duty is to provide air for starting and, unless the turbochargers are very efficient, it is also necessary to provide part of the overall compression.

During the development of a turbocharging system, it is normal to adjust the components of the turbocharger so that the compressors and turbines are run as near as possible at the highest efficiency that can be obtained for the pressure conditions existing. Alternative compressor diffusers are available, so that, for any given turbine power, the peak efficiency of the compressor may provide a high pressure and small flow, or a large flow and low pressure, or some in between condition. In a similar manner in order to produce the required turbine power the turbine may have a large nozzle area and so use a large quantity of exhaust gas at a low pressure, or it may have a small nozzle area and use a small quantity of exhaust gas at a high pressure, or some in between combination.

If the frame size of turbochargers 5 and 6 are the same, compressor 8 of turbocharger 5 is fitted with a smaller diffuser than compressor 9 of turbocharger 6. This makes compressor 8 capable, or more nearly capable, of equalling the combined pressures of compressors 9 and 7 when passing less air than the series system.

A further increase in the pressure given by compressor 8 is obtained by having a larger nozzle area in its turbine 10 than that of turbine 11 so that turbine 10 develops the greater power. Thus, when using this to provide the smaller quantity of air a substantial difference in the delivery pressures of the two turbochargers can be achieved, and the series charger 7 can be made to do a substantial amount of charging work.

Turbines 10 and 11 are supplied with exhaust gas from the engine by a manifold 12. That shown is of the constant pressure type but other known systems may be used. For example, the division of the exhaust gases can take place at the exhaust ports or, when the exhaust timing periods are suitable, one turbocharger may take all the exhaust gas from one group of cylinders and the other take the exhaust from another group which may be different in number.

Engines which are required to operate at low power with high rotational speed tend to run into surge of the high pressure turbocharger if the throughput per engine revolution of the series charger is maintained constant. The provision of a recirculation valve 13, or a comparable control which stops an excessive pressure rise through the series charger at high engine speeds, lowers the total pressure rise given by the series system and so takes the working point of the high pressure charger away from surge.

While the engine is being cranked before starting, the only air delivered is that by series charger 7 and which passes to the air chest 4, from which it can pass through the cylinders 2 and in a reverse direction through compressor 8. This reverse flow can be avoided by the provision of a non return valve 14 which may take the form of a light flap which is held shut by gravity, and pressure from the compressor side, and opens by flow into the compressor by depression on the compressor side.

Figure 3:
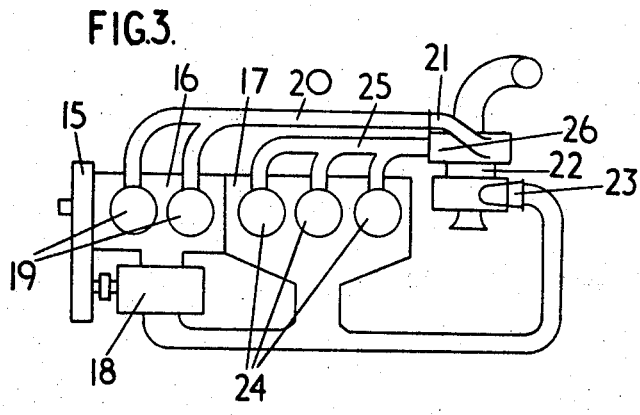
FIGURE 3 shows in diagrammatic form the layout of the charging system of an engine having separate air chests for groups of cylinders, and which segregates the cylinders supplied by the series charger from the cylinders supplied by the simple turbocharging system, with both systems being supplied by a single turbocharger.

This valve need not be used if the engine does not have a common air chest for the two charging systems, as shown in FIGURE 3 where engine 15 has separate air chests 16 and 17. As air chest 16 is supplied by a series charger 18 it gives a positive supply of air to the cylinders 19, which consequently start and run as would a known series charging system. By taking the exhaust from these cylinders via a manifold 20 to turbine entry 21 of a turbocharger 22, compressor 23 is made to deliver air into air chest 17, and thus cylinders 24 have air for starting. Air is also delivered to the intake of series charger 18 thereby increasing its delivery pressure, and the pressures build up rapidly throughout the system, with air chest 16 staying at a higher pressure than air chest 17. The exhaust from cylinders 24 passes via a manifold 25 to turbine entry 26 of turbocharger 22 and the entry is in communication with turbine nozzle means isolated from that in communication with entry 21.

At any running condition the air flow through a cylinder depends upon both the air density in the associated air chest and the pressure difference between the air chest and the exhaust manifold. The air delivery to each cylinder and thus the trapped air for combusion is made approximately equal by adjustment of the relative nozzle areas supplied by the two turbine entries 21 and 26. For the same total nozzle area, reducing the nozzle area supplied by entry 21 and increasing the area of the nozzle supplied by entry 26, lowers the pressure in exhaust manifold 25 without substantial change of air chest pressure, and thus the flow to the engine cylinders 24 is increased. The pressure rise across series charger 18 increases to maintain its fixed volumetric flow against the higher pressure existing in manifold 20. By these means equal charging of the cylinders is obtained.

Figure 4:
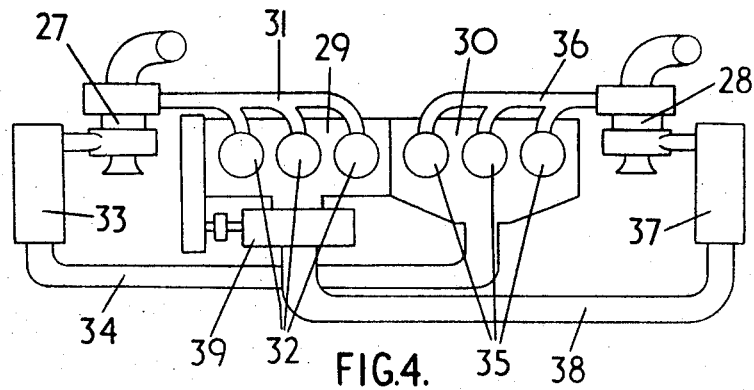
FIGURE 4 shows in diagrammatic form the charging system of an engine having separate air chests for groups of cylinders and which segregates those supplied by the series charger from those simply turbocharged, with the turbocharger of the simply charged cylinders being driven by the exhaust gas from the series charged cylinders and vice versa.

On engines having two turbochargers 27 and 28 as shown in FIGURE 4 and having two air chests 29 and 30, starting is improved by taking advantage of the reduced rotor inertia by arranging an exhaust manifold 31 to take all the exhaust gas from cylinders 32 to turbocharger 27. This then accelerates rapidly and by taking all its air delivery via an air cooler 33 and a duct 34 to air chest 30, flow is rapidly built up through cylinders 35 with consequent easy starting of these cylinders. The exhaust gases from these cylinders pass via an exhaust manifold 36 to turbocharger 28, which delivers the whole of its air via an air cooler 37 and a duct 38 to the intake of a series charger 39.

Figure 5:
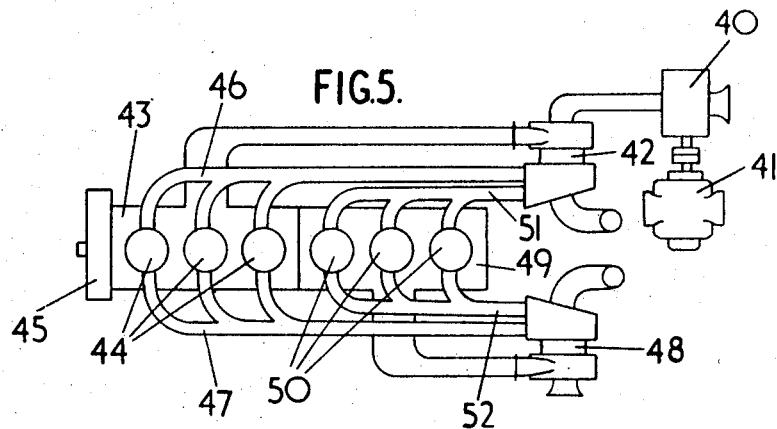
FIGURE 5 shows in diagrammatic form the charging system of an engine having separate air chests for groups of cylinders and which segregates the cylinders supplied by a motor driven series charger, from the remaining cylinder and in which two turbochargers share the exhaust gas from the cylinders, with one being supplied by said series charger and the other supplying the rest of the cylinders.

The series charger is not essentially engine driven and FIGURE 5 shows how the invention may be applied to an engine with a motor driven series charger. It also shows a way of arranging the exhaust manifolds on an engine having two exhaust systems from each cylinder such that no duct or manifold has to cross from one side of the engine to the other. A series charger 40 is driven by a motor 41 which may be a variable speed electric motor. The air from charger 40 passes to a turbocharger 42 where its pressure is raised further before delivery to an air chest 43 supplying cylinders 44 of an engine 45 which may be of the opposed piston type. Exhaust gas from the cylinders passing to both sides of the engine are ducted by manifolds 46 and 47 to turbochargers 42 and 48 respectively. The supply of exhaust gas to turbocharger 48 sets the rotor spinning and air is delivered to an air chest 49 supplying cylinders 50 to permit starting. The exhaust gas from these cylinders passes via exhaust manifolds 51 and 52 to different turbocharger entries of turbochargers 42 and 48 to those connected to exhaust manifolds 46 and 47.

The motor driven series charger positioned before the turbocharger compressor can be used only when more than one turbocharger is used, and if used in the system of FIGURE 3 would have to take the same position as series charger 18. With this system the balance of work of the two turbochargers can be adjusted by change of the relative areas of their nozzle rings, with the turbine power increasing with increase of its relative nozzle area. It is not necessary for the working of the system that the mean exhaust pressure be the same at both sides of the engine. This will to some extent vary in the opposite sense to the nozzle area of the associated turbine.

Figure 6:
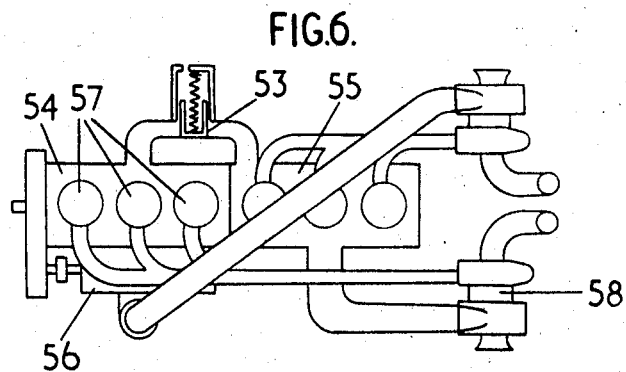
FIGURE 6 shows in diagrammatic form an engine having partially separated air chests for groups of cylinders and in which the area of a passage joining the same may be varied to suit the engine operating conditions.

In the engine of FIGURE 6 the air chest is neither completely common nor divided, but has a partial barrier, which may be a valve 53 which connects air chests 54 and 55. As a result, there can exist a pressure difference between the air chests dependent on the degree of restriction which causes more of the air from a series charger 56 to pass to the unrestricted part of the air chest 54 and through cylinders 57. This improves starting compared with the engine of FIGURE 1, but if this restriction is retained at high loads the larger fluctuations of pressure in air chest 55 lower the efficiency of turbocharger 58 unless a very spacious air chest is used.

It is generally advantageous to have valve 53 closed during starting and so avoid the necessity of requiring the valve 14 of FIGURE 1. The valve 53 when partially open allows the pressure in chest 55 to be sufficiently below that in chest 54 to avoid surge of the compressor of turbocharger 58 at light engine loads. Valve 53 is fully open for high output, when high efficiency of the compression process is desirable. However in some cases, particularly when the engine is nearly capable of running simply turbocharged, then a constant area restriction between the air chests suffices.

The turbocharging systems described give methods by which pressure may be added to that of the delivery from the turbochargers by means of a series charger of a size appreciably less than that of the known series charging system. Tests have shown that when the series charger is of the normal Roots type, satisfactory operation can be obtained when the throughput is of the order of 65 percent of the engine swept volume. This is about 50 percent of the throughput of that used for the known series system, and not only reduces the bulk and cost of the series charger, but it also works nearer its optimum pressure ratio for peak efficiency. Thus it takes less power to drive, even when working at twice the pressure ratio of the known system. The matching of the turbochargers has been shown possible within the normal commercial range of components for any frame size.

Where this does not give sufficient margin for adjustment, and say more output is required from the high pressure turbocharger, then with some designs of engine it can be arranged that this turbocharger be supplied with exhaust gas from a larger number of exhaust ports than for the low pressure turbocharger. Alternatively this latter machine may be operated intentionally with an efficiency below the best.

Matching problems exist at light loads and high speeds. The solution of these lie in either division of the air chest or the use of a recirculation valve on the series charger. Obtaining a rapid increase of turbocharger speed during starting can be obtained with the divided air chest or by the use of a non return valve at the high pressure compressor inlet.

Because of the efficient use of the series charger the system is particularly well suited to turbocharging without charge cooling. However, many known systems of charge cooling may be used to give a further increase in output for the same exhaust gas temperature.

I claim:

1. A multi-cylinder two cycle turbocharged compression ignition engine of the type in which each cylinder is provided with inlet and outlet means, comprising a simple turbocharging system having a compressor and an exhaust gas turbine driving the compressor and at least one system embodying a two-stage series combination of compressors, a gas turbine driving one stage and power means driving the other stage, said systems operating at the same time, means continuously connecting each of the systems for the passage of air to the inlet means of at least one of the cylinders whereby the air scavenges and charges the cylinders, and means providing communication between the exhaust gas turbine of the simple turbocharging system and the outlet means of the cylinders supplied by the series system.

2. The engine as claimed in claim 1 in which the simple and series charging systems supply air to a common air chest.

3. The engine as claimed in claim 1 in which groups of cylinders supplied by said series turbocharging system have an air chest separate from an air chest supplied by said simple turbocharging system.

4. The engine as claimed in claim 3 in which there is communication between the air chests by a passageway of controlled cross-sectional area.

5. The engine as claimed in claim 4 in which said controlled area is variable and is changeable to suit engine operating conditions.

6. The engine as claimed in claim 1 in which groups of cylinders supplied by said series turbocharging system have an air chest separate from an air chest supplied by said simple turbocharging system and all the exhaust gas produced by the cylinders charged by the series turbocharging system pass to the turbine means of the simple turbocharging system.

References Cited

UNITED STATES PATENTS

| | | | |
|---|---|---|---|
| 2,359,615 | 10/1944 | Browne | 60—13 |
| 2,780,053 | 2/1957 | Cowland | 60—13 |
| 3,355,879 | 12/1967 | Smith | 60—13 |

FOREIGN PATENTS

| | | |
|---|---|---|
| 979,010 | 12/1950 | France. |

CARLTON R. CROYLE, Primary Examiner

D. HART, Assistant Examiner

U.S. Cl. X.R.

123—65